United States Patent
Ryu et al.

(10) Patent No.: US 8,278,443 B2
(45) Date of Patent: Oct. 2, 2012

(54) OPTICAL FILMS RESIN COMPOSITION COMPRISING POLYARYLATE RESIN AND AMINO RESIN HAVING TRIAZINE STRUCTURE, AND OPTICAL FILMS PREPARED BY USING THE SAME

(75) Inventors: Sang-Uk Ryu, Daejeon (KR); Dong-Ryul Kim, Daejeon (KR); Dae-Woo Nam, Daejeon (KR)

(73) Assignee: LG Chem, Ltd., Seoul (KR)

( * ) Notice: Subject to any disclaimer, the term of this patent is extended or adjusted under 35 U.S.C. 154(b) by 399 days.

(21) Appl. No.: 12/448,758

(22) PCT Filed: Jan. 4, 2008

(86) PCT No.: PCT/KR2008/000048
§ 371 (c)(1),
(2), (4) Date: Jul. 6, 2009

(87) PCT Pub. No.: WO2008/082264
PCT Pub. Date: Jul. 10, 2008

(65) Prior Publication Data
US 2010/0028566 A1 Feb. 4, 2010

(30) Foreign Application Priority Data
Jan. 5, 2007 (KR) .................. 10-2007-0001549

(51) Int. Cl.
| C07D 251/54 | (2006.01) |
| C07D 251/70 | (2006.01) |
| C08L 79/08 | (2006.01) |
| C09K 19/38 | (2006.01) |
| B29D 11/00 | (2006.01) |

(52) U.S. Cl. ........ 544/194; 544/196; 544/204; 525/497; 428/1.1; 428/1.33; 428/336; 428/411.1

(58) Field of Classification Search .................. 544/194, 544/196, 204; 525/497
See application file for complete search history.

(56) References Cited

U.S. PATENT DOCUMENTS

| 5,275,881 A | 1/1994 | Ikeda et al. |
| 5,580,950 A | 12/1996 | Harris et al. |
| 7,109,274 B2 | 9/2006 | Acar et al. |
| 2005/0203239 A1 | 9/2005 | Shibahara et al. |
| 2005/0209404 A1 | 9/2005 | Sakurai et al. |
| 2008/0198446 A1* | 8/2008 | Asakura et al. ............. 359/352 |

FOREIGN PATENT DOCUMENTS

| CN | 1668695 | 9/2005 |
| EP | 1553138 | 7/2005 |
| JP | 2000-267076 | 9/2000 |
| JP | 13-019749 A | 1/2001 |
| JP | 2001-019749 | 1/2001 |
| JP | 2004-070290 | 3/2004 |
| JP | 2005-165308 | 6/2005 |
| JP | 2005-225998 | 8/2005 |
| JP | 2008-513833 | 5/2008 |
| KR | 10-2006-0051545 | 5/2006 |
| WO | WO 2006/033554 | 3/2006 |

* cited by examiner

*Primary Examiner* — Venkataraman Balasubramanian
(74) *Attorney, Agent, or Firm* — McKenna Long & Aldridge LLP

(57) ABSTRACT

The present invention relates to a resin composition for an optical film, comprising a polyarylate resin and an amino resin having a triazine structure, and to an optical film prepared by using the same. By using the resin composition for an optical film, a thickness direction retardation can be controlled, while having a negative value, during a step of fabricating the optical film, an in-plane retardation can be controlled, and the optical film can be used as a substrate of a display instead of a glass substrate without an additional retardation compensation film.

20 Claims, No Drawings

OPTICAL FILMS RESIN COMPOSITION COMPRISING POLYARYLATE RESIN AND AMINO RESIN HAVING TRIAZINE STRUCTURE, AND OPTICAL FILMS PREPARED BY USING THE SAME

TECHNICAL FIELD

The present invention relates to a resin composition for an optical film, comprising a polyarylate resin and an amino resin having a triazine structure, and to an optical film prepared by using the same.

This application claims priority from International Patent Application No. PCT/KR2008/000048 filed on Jan. 4, 2008 and Korean Patent Application No. 10-2007-0001549 filed on Jan. 5, 2007 in the KIPO, both of which are incorporated herein by reference in their entirety.

BACKGROUND ART

Recently, flat panel display devices such as a liquid crystal display device and an organic light emitting device have been actively developed due to their low energy consumption and light weight, and as their substrate material, glass has been generally used. However, glass is easily breakable and heavy, and difficult to produce as a thin film. In order to solve the problems, if a polymer film is used instead of glass, a flat panel display being light, thin, and flexible can be produced.

For example, US patent No. 2005/0203239A1 discloses that the glass substrate is replaced with composite compositions, that is, cured glass fiber/epoxy resin or cured glass fiber/acryl resin. Further, US patent No. 2005/0209404A1 discloses that the glass substrate is replaced with a polymer film using resins with a high glass transition temperature. However, in order to apply it to the general liquid crystal display device, a retardation film is needed in addition to the polymer film.

Generally, in a liquid crystal display, liquid crystal is injected between two substrates on which electrodes are formed, and the intensity of voltage that is applied to the electrodes is controlled to adjust the amount of transmitted light. The liquid crystal molecules have the anisotropy, and the anisotropy of liquid cells or films that include the molecules depends on how the liquid crystal molecules are distributed and an inclination angle of the molecules in respect to the substrate. Accordingly, in the case of the liquid crystal display, the amount and the color of light depends on the viewing angle.

It is required that the retardation film which has almost the same birefringence as the liquid crystal and the negative retardation is used to compensate the viewing angle.

In order to produce the retardation film that has the negative retardation in the thickness direction, a process of stretching a film, and a process of casting a substance having the birefringence are used. Currently, most retardation film is produced using the stretching process. However, since a stretching ratio is mechanically controlled, it is not easy to desirably control the angle, and the polarizing plates must be attached one by one while rolls are not used during the attachment by means of the polarizing plates. Accordingly, efficiency of the process is poor and it is difficult to control impurities.

Korean Patent Application No. 10-2005-0004439 discloses a process of casting liquid crystal having the birefringence. However, since the birefringence of the liquid crystal is very high and sensitive to the casting thickness, it is difficult to obtain a clear color display in the wide area.

On the other hand, in order to produce a retardation film having the thickness direction retardation, polyarylate has been used. If it is processed to a film type, the retardation becomes very high. Actually, its application to the liquid crystal display is impossible. Therefore, technologies capable of controlling the thickness direction retardation are needed.

For example, in U.S. Pat. No. 5,580,950, polyarylate is used. In the case of a film having a thickness of 50 μm, the thickness direction retardation becomes to be several hundred to several thousand nm. Therefore, it is hard to use as a retardation film of the liquid crystal display. However, an in-plane retardation can be easily controlled by the stretching process.

Further, Japanese patent application No. 2001-19749 discloses that the composition of monomers is changed to decrease the birefringence, however, which deteriorates high heat resistance that is an advantage of polyarylate.

Further, PCT/KR2005/003057 discloses that polyarylate has excellent light transmittance and heat resistance to increase gas barrier property, and it can be also applied as the polymer substrate material instead of glass to the flat panel display such as liquid crystal display. However, there is no report on a polymer film having a function of retardation film as a substitute of glass in the liquid crystal display.

DISCLOSURE OF INVENTION

Technical Problem

Accordingly, in order to solve the problems in the prior art, it is an object of the present invention to provide a resin composition for an optical film, in which during a film fabrication step, a polyarylate resin and an amino resin having a triazine structure are mixed to control a thickness direction retardation, while having a negative value and to control in-plane retardation.

Further, it is another object of the present invention to provide an optical film, in which in connection with transparency and high heat resistance of polyarylate, the optical film is used as a substrate of a display instead of a glass substrate without an additional retardation film, and also used as a retardation film, and a display comprising the same.

Technical Solution

The present invention provides a resin composition for an optical film, comprising an amino resin having a triazine structure and a polyarylate resin.

The present invention provides an optical film, prepared by using the resin composition for an optical film comprising an amino resin having a triazine structure and a polyarylate resin.

The present invention provides a display comprising the optical film as a substrate.

The present invention provides a display comprising the optical film as a retardation film.

Advantageous Effects

According to the present invention, a resin composition for an optical film, comprising an amino resin having a triazine structure and a polyarylate resin, can be used as a substrate of a display instead of a glass substrate without an additional retardation film, in connection with transparency and high heat resistance of polyarylate. By using the composition, a thickness direction retardation of an optical film can be controlled, while having a negative value, according to the content of the amino resin having a triazine structure during a step of fabricating the optical film, and the prepared film is stretched to control an in-plane retardation.

BEST MODE FOR CARRYING OUT THE INVENTION

Hereinafter, the present invention will be described in detail.

The resin composition for an optical film of the present invention is characterized in that a polyarylate resin and an amino resin having a triazine structure are mixed. In connection with the resin composition for an optical film, a thickness direction retardation of a film can be controlled according to the content of the amino resin having a triazine structure, and the prepared film is stretched to control an in-plane retardation.

When the polyarylate resin and the amino resin having a triazine structure are mixed with each other, a catalyst may be added thereto. As the catalyst, acid that is generally used as a curing catalyst of the amino resin is preferable, and examples thereof include $C_1$ to $C_{10}$ organic acids such as acetic acid, benzoic acid, oxalic acid, toluenesulfonic acid, and methanesulfonic acid; and inorganic acids such as hydrochloric acid, sulfuric acid, nitric acid, and phosphoric acid. Further, tin compounds such as dibutyltin dilaurate (CAS No. 77-58-7) may be used.

It is preferable that the amino resin having a triazine structure contained in the resin composition for an optical film of the present invention comprises a monomer or oligomer, represented by the following Formula 1, but is not limited thereto.

[Formula 1]

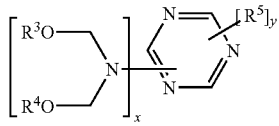

wherein x and y are an integer, satisfying the following conditions: $x+y=3$, $1 \leq x \leq 3$, and $0 \leq y \leq 2$, and $R^3$, $R^4$ and $R^5$ are each independently selected from hydrogen, halogen, alkyl having $C_1$-$C_{10}$ carbon atoms, arylalkyl having $C_7$-$C_{12}$ carbon atoms, aryl having $C_6$-$C_{12}$ carbon atoms, and acyl having $C_1$-$C_{12}$ carbon atoms.

Specifically, examples of the amino resin having a triazine structure include hexamethoxymethylenemelamine, hexaethoxymethylenemelamine, hexahydroxymethylenemelamine, hexabutoxymethylenemelamine, tetrahydroxymethylenebenzoguanamine, tetramethoxymethylenebenzoguanamine, tetraethoxybenzoguanamine, and tetrabutoxymethylenebenzoguanamine, and may be in combination of one or more kinds, but are not limited thereto.

The amino resin having a triazine structure may be used in an amount of 0.1 to 100 parts by weight corresponding to a desired retardation, based on 100 parts by weight of the polyarylate resin. In this connection, in the case where the used amount is less than 0.1 parts by weight, the effect of reducing the retardation is poor. In the case where the used amount is more than 100 parts by weight, the effect of reducing the retardation is saturated, whereby the effect becomes poor.

The polyarylate resin contained in the resin composition for an optical film of the present invention refers to an aromatic polyester resin prepared by condensation of aromatic dicarboxylic acid and aromatic diol. The polyarylate resin can have various structural formulae depending on the used raw materials, but it is preferably prepared by condensation of bisphenol A as divalent phenol and terephthalic acid or isophthalic acid as aromatic dicarboxylic acid. The polyarylate resin may include a repeating unit of the following Formula 2.

[Formula 2]

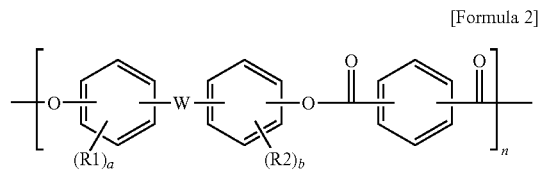

wherein a and b are each independently an integer of 0 to 4, R1 and R2 are each independently selected from halogen, alkyl, alkenyl, or alkynyl having $C_1$-$C_{12}$ carbon atoms, arylalkyl having $C_7$-$C_{12}$ carbon atoms, aryl having $C_6$-$C_{12}$ carbon atoms, nitrile having $C_1$-$C_{12}$ carbon atoms, alkoxy having $C_1$-$C_{12}$ carbon atoms, and acyl having $C_1$-$C_{12}$ carbon atoms, with the proviso that a is 2 or more, two or more of R1 may be the same or different from each other, with the proviso that b is 2 or more, two or more of R2 may be the same or different from each other, and W is one selected from alkylidene having $C_1$-$C_{30}$ carbon atoms, alkylene having $C_2$-$C_{30}$ carbon atoms, cycloalkylidene having $C_3$-$C_{30}$ carbon atoms, cycloalkylene having $C_3$-$C_{30}$ carbon atoms, phenyl-substituted alkylene having $C_2$-$C_{30}$ carbon atoms, nitrogen derivatives such as NH or NR (wherein, R is defined as in R1 and R2), phosphorus derivatives, phosphorus oxide, oxygen, sulfure, sulfoxide and sulfone.

The phosphorus derivatives are a compound containing phosphorus, and may be represented by PH or PR (wherein, R is defined as in R1 and R2).

Examples of the aromatic dicarboxylic acid used for the preparation of the polyarylate resin of the present invention include, but are not limited to terephthalic acid, isophthalic acid, dibenzoic acid, naphthalene dicarboxylic acid, 4,4'-methylene-bis(benzoic acid), 1,2-bis(4-hydroxycarbonylphenyl)ethane, 2,2-bis(4-hydroxycarbonylphenyl)propane, 4,4'-oxo-bis(benzoic acid), bis(4-hydroxycarbonylphenyl)sulfide, bis(4-hydroxycarbonylphenyl)sulfone, and aromatic dicarboxylic acid in which aromatic groups thereof are substituted with a $C_1$ to $C_2$ alkyl group or a halogen group, and these examples may be used alone or in combination of two or more kinds. In particular, among total aromatic dicarboxylic acids, a mixture of 10 to 90 mol % of terephthalic acid halide and 90 to 10 mol % of isophthalic acid halide is preferably used.

Examples of the aromatic diol compound used for the preparation of the polyarylate resin of the present invention may include bis(4-hydroxyaryl)alkane, bis(hydroxyaryl)cycloalkane, dihydroxy diarylether, dihydroxy diarylsulfide, dihydroxy diarylsulfoxide, and dihydroxy diarylsulfone, and these examples may be used alone or in combination of two or more kinds.

Specifically, examples of bis(4-hydroxyaryl)alkane include bis(4-hydroxyphenyl)methane, 2,2-bis(4-hydroxyphenyl)propane (BPA), 2,2-bis(4-hydroxyphenyl)ethane, 2,2-bis(4-hydroxy-3-methylphenyl)propane, 2,2-bis(4-hydroxyphenyl)heptane, 2,2-bis(4-hydroxy-3,5-dichlorophenyl)propane, 2,2-bis(4-hydroxy-3,5-dibromophenyl)propane, bis(4-hydroxyphenyl)phenylmethane, 4,4-dihydroxy phenyl-1,1-m-diisopropylbenzene, 4,4-dihydroxyphenyl-9,9-fluorene, 2,2-bis(4-hydroxyphenyl)fluorene, 9,9-bis(3,5-dimethyl-4-hydroxyphenyl)fluorene, and 9,9-bis(3,5-dibromo-4-hydroxyphenyl)fluorine. These examples may be used alone or in combination of two or more kinds, but are not limited thereto.

Further, examples of bis(hydroxyaryl)cycloalkane include 1,1-bis(4,4'-hydroxyphenyl)cyclopentane, 1,1-bis(4,4'-hydroxyphenyl)cyclohexane, 1-methyl-1-(4-hydroxyphenyl)-4-(dimethyl-4-hydroxyphenyl)cyclohexane, 4-{1-[3-(4-hydroxyphenyl)-4-methylcyclohexyl]-1-methylethyl}phenol, 4,4-[1-methyl-4-(1-methylethyl)-1,3-cyclohexylidyl]bisphenol, and 2,2,2,2-tetrahydro-3,3,3,3-tetramethyl-1,1-spirobis-[1H]-indene-6,6-diol. These examples may be used alone or in combination of two or more kinds, but are not limited thereto.

Further, examples of dihydroxy diarylether include bis(4-hydroxyphenyl)ether, bis(4-hydroxy-3,5-dichlorophenyl)ether, and 4,4-dihydroxy-3,3-dimethylphenylether; examples of dihydroxy diarylsulfide include 4,4-dihydroxy diphenylsulfide and 4,4-dihydroxy-3,3-dimethyldiphenylsulfide; examples of dihydroxy diarylsulfoxide include 4,4-dihydroxy diphenylsulfoxide and 4,4-dihydroxy-3,3-dimethyldiphenylsulfoxide; examples of dihydroxy diarylsulfone include 4,4-dihydroxy diphenylsulfone(BPS) and 4,4-dihydroxy-3,3-dimethyldiphenylsulfone. These examples may be used alone or in combination of two or more kinds, but are not limited thereto.

A weight average molecular weight of the polyarylate resin is preferably 10,000 to 500,000.

The polyarylate resin of the present invention may be prepared by a known method in the related art, for example, interfacial polymerization, melt polymerization, solution polymerization or the like, and preferably interfacial polymerization in terms of reaction rate and isolation/purification of polymer after polymerization.

In the above polymerization method, a polymerization temperature is 0 to 40° C., and preferably 0 to 30° C., since hydrolysis of aromatic dicarboxylic acid halide and polyarylate resin is inhibited in the above temperature range. After completing the polymerization according to the above method, an excessive amount of base is neutralized with acid, and the stirring is stopped. Then, the aqueous layer is discarded, and the resultant is repeatedly washed to remove salts, resulting in a polyarylate resin.

Further, one or more of a molecular weight regulator, a base, an organic solvent and a phase transfer catalyst can be added to the polymerization of the polyarylate resin.

The molecular weight regulator can be used to regulate a molecular weight of the polymer. Examples of the suitable molecular weight regulator may include a monovalent hydroxy compound such as phenol, o-cresol, m-cresol, p-cresol, o-ethyl phenol, m-ethyl phenol, p-ethyl phenol, o-propyl phenol, m-propyl phenol, p-propyl phenol, o-tert-butyl phenol, m-tert-butyl phenol, and p-tert-butyl phenol; a monovalent alcohol such as methanol, ethanol, n-propanol, isopropanol, n-butanol, pentanol, hexanol, dodecyl alcohol, stearyl alcohol, benzyl alcohol, and phenethyl alcohol; and a monovalent (aromatic)carboxylic acid halide such as benzoyl chloride, acetic acid halide, propionic acid halide, octanoic acid halide, cyclohexylcarboxylic acid halide, toluic acid halide, p-tert-butylbenzoic acid halide, p-methoxyphenylacetic acid halide; and sulfonyl chloride such as benzenesulfonyl chloride, tosyl chloride, and methanesulfonyl chloride.

Examples of the base may include alkali metal hydroxide such as sodium hydroxide and potassium hydroxide. It is preferable that the amount of base is 1.01 to 2 times as much as the mole number of the phenolic hydroxyl group contained in divalent phenol and monovalent phenol compounds. If the amount is less than 1.01 times, it is impossible to completely dissolve the divalent phenol compound. If the amount is more than 2 times, an excessive amount of acid is needed for neutralization. Additionally, in consideration of hydrolysis of aromatic dicarboxylic acid halide that occurs during the polymerization process, the amount of base is preferably set to be 1.01 to 2 times as much as the mole number of the phenolic hydroxyl group.

It is preferable that an organic solvent is capable of dissolving polyarylate while the organic solvent is not mixed with water. Examples of the organic solvent include methylene chloride, 1,2-dichloroethane, chloroform, carbon tetrachloride, chlorobenzene, 1,1,2,2-tetrachloroethane, and these examples may be used alone or in combination of two or more kinds.

A phase transfer catalyst may be used in order to improve a polymerization rate of an interfacial polymerization, and examples thereof include a tetraalkylammonium ion, a tetraalkylphosphonium ion, and a nonionic surfactant.

The polyarylate resin prepared by the above-described method is an engineering plastic resin having excellent physical properties, and it is transparent and has a high birefringence, thereby being used as a retardation film of a display. Further, the polyarylate resin has high heat resistance, thereby being used as a polymer film, which is a substrate of flat panel display, instead of a glass substrate. In order to use the polyarylate resin as the polymer film that is a substrate of flat panel display or retardation film, the polyarylate resin may be prepared in a film type by using a melt extrusion method, a casting method or the like. Of them, the casting method is preferable in that upon casting, a film thickness is easily controlled to precisely regulate the thickness direction retardation, the in-plane retardation occurred upon melt extrusion is minimized, and a film having a uniform composition can be obtained. When the polyarylate resin is produced in a film type by casting, its thickness is 10 μm or more, and preferably 20 μm or more in order to maintain the film type itself. In the case of forming the film using the polyarylate resin only, as in the prior arts, the thickness direction retardation of the film has 200 nm or more, which is an absolute value. Thus, it is not suitable for the retardation film of a liquid crystal display. Therefore, the thickness direction retardation should be controlled, however, which is not easy. However, in the present invention, the polyarylate resin and amino resin having a triazine structure are mixed to produce the film by the method for controlling the thickness direction retardation without inhibiting the transparency and high heat resistance of polyarylate, thereby controlling the thickness direction retardation without inhibiting the transparency and high heat resistance of the polyarylate resin.

The present invention provides an optical film, prepared by using the resin composition for an optical film comprising an amino resin having a triazine structure and a polyarylate resin. In this connection, a thickness direction retardation of the optical film can be controlled according to the content of the amino resin having a triazine structure, and the prepared film is stretched to control an in-plane retardation.

First of all, in order to produce the in-plane retardation, the optical film is preferably stretched. The stretching process may be performed, when the film is not dried, or after drying the film. The stretching process may be performed either during fabricating the film, or in a unwind film after winding the film. The stretching process is preferably performed at 80 to 250° C., and the stretching ratio is preferably 1% to 500%, depending on the amount of the residual solvent in the film.

Refractive indexes $n_x$, $n_y$, and $n_z$ are measured in respect to axes at 590 nm while the axis having the highest refractive index in the surface direction of the optical film is set to an x-axis, the axis being perpendicular to the x-axis in the surface direction is set to an y-axis, and the axis being perpendicular to the x-y plane is set to a z-axis. The thickness of the film may be measured to calculate the thickness direction retardation and in-plane retardation of the optical film using the following Equations 1 and 2.

$$R_{th} = \left(n_z - \frac{n_x + n_y}{2}\right) \times d \qquad \text{[Equation 1]}$$

wherein $n_x$ is a refractive index of the direction having the highest refractive index in a film surface, $n_y$ is the refractive index of the direction perpendicular to the direction of $n_x$ in the film surface, $n_z$ is the refractive index of the direction perpendicular to a plane of the film, d is a thickness of the film, and $R_{th}$ is a thickness direction retardation.

$$R_{in} = (n_x - n_y) \times d \qquad \text{[Equation 2]}$$

wherein $n_x$ is a refractive index of the direction having the highest refractive index in a film surface, $n_y$ is the refractive index of the direction perpendicular to the direction of $n_x$ in the film surface, d is a thickness of the film, and $R_{in}$ is an in-plane retardation.

In the optical film according to the present invention, its thickness direction retardation is a negative value, in which its absolute value is in the range of 0 to 1000 nm, and its in-plane retardation is in the range of 0 to 1000 nm. The values may be controlled within the above range according to the desired purpose.

The optical film of the present invention preferably has a thickness of 10 to 200 μm. If the thickness is 10 μm or less, it is hard to treat the film due to static electricity or the like. If the thickness is 200 μm or more, much time is required to dry the solvents without the improvement of the physical properties, which is not economical.

The optical film according to the present invention can be prepared by the following method.

Polyarylate resin, used for the optical film, is prepared as follows: dissolving the polyarylate resin, which was isolated from the polyarylate resin solution according to the method for synthesizing the polyarylate resin, in a solvent; or removing water from the polyarylate resin solution after the solution is washed, and adding an appropriate solvent; or concentrating the polyarylate resin solution after the solution is washed.

The polyarylate resin may be added to the diluted amino resin having a triazine structure in the solvent or the amino resin having a triazine structure may be added to the diluted polyarylate resin in the solvent. However, in terms of reducing the dissolution time, the polyarylate resin is preferably added to the amino resin diluted in the solvent to prepare the polymer solution. The polymer solution may be stirred at room temperature, or may be heated to a boiling point.

The resin composition for an optical film comprising a polyarylate resin and an amino resin having a triazine structure of the present invention can be prepared in a film form using a casting method. In the polymer solution containing a polyarylate resin and an amino resin, the polymer concentration is not limited. However, the quantity of the solvent is preferably 100 to 3300 parts by weight, and more preferably 100 to 2000 parts by weight, based on 100 parts by weight of the polyarylate resin in order to obtain the viscosity required during the casting.

As a solvent used in the preparation of a polymer solution containing the polyarylate resin and amino resin, any solvent can be used as long as it can dissolve the polyarylate resin. Examples of the solvent include, but are not limited to halogenated hydrocarbons such as methylene chloride, chloroform, carbon tetrachloride, dichloromethane, tetrachloroethane, and trichloroethane; ketones such as acetone, methyl ethylketone, methylisobutylketone, cyclohexanone, and cyclopentanone; esters such as ethyl acetate and methyl acetate; cyclic ethers such as tetrahydrofuran, dioxane, and dioxolane; aromatic hydrocarbons such as benzene, toluene, xylene, and methoxybenzene; alcohols such as methanol, ethanol, and ethylene glycol; an amide solvent such as dimethylformamide and dimethylacetamide; and ethers such as diethylether and dibutylether. These solvents may be used alone or in combination of two or more kinds.

The polymer solution containing the polyarylate resin and amino resin may be mixed with various types of additives such as a UV stabilizer, a heat stabilizer, a plasticizer, a mat agent, an adhesion promoter, and a filler, if necessary. These additives may be used alone or in combination of two or more kinds.

The optical film according to the present invention can be prepared using the polymer solution containing the polyarylate resin and the amino resin having a triazine structure by a casting process such as a spin casting process, a roll casting process, a flow casting process, a print process or the like, a dip coat process, a gravure casting process, and a bar casting process. In this connection, when the polymer solution containing the polyarylate resin and the amino resin having a triazine structure is subjected to the casting process and the solvent is subjected to drying, it is preferable that the temperature is gradually increased or the solvent is subjected to drying at a predetermined temperature.

The optical film of the present invention is an unstretched or stretched film, and the optical film may be used alone as the retardation film of a display. Further, in connection with transparency and high heat resistance of the polyarylate resin, the optical film may be used as a substrate of a flat panel display instead of a glass substrate.

Further, the optical film of the present invention may have a gas barrier layer, a moisture barrier layer such as $SiO_x$ (x is 1 to 2), SiON, $AlO_x$ (x is 1 to 3), AlON, AlON, ITO, IZO, an oxygen barrier layer or a transparent conductive layer such as ITO and IZO on at least one side of the film. They may be generally produced by sputtering, chemical vapor deposition (CVD) or plasma-enhanced chemical vapor deposition (PECVD).

The optical film of the present invention may be additionally subjected to a treatment such as hard coating treatment, anti-reflection treatment, anti-sticking treatment, diffusion treatment, and anti-glare treatment, if necessary.

The hard coating treatment is applied, for example, to prevent scratches on the surfaces of the optical film. A surface of the optical film can be applied with a coating film of a cured resin with excellent hardness and activity. Examples of the cured resin include ultraviolet-cure type resins such silicone-based, urethane-based, acrylic-based, and epoxy-based, and the treatment may be performed by a known method.

The anti-sticking treatment may be performed by a known method for the purpose of preventing adherence of adjacent layers.

The anti-reflection treatment may be performed by forming an anti-reflection layer or the like known in the art for the purpose of preventing the reflection of outdoor daylight on the surface of the optical film.

The anti-glare treatment may be performed by a known method for the purpose of preventing visibility of transmitted light from being hindered by outdoor daylight reflected on the surface of the optical film.

The optical film of the present invention may be single layered structure or laminated structure with two or more layers.

The present invention provides a display comprising the optical film of the present invention as a substrate. Specifically, the optical film can be used as a substrate of liquid crystal cells in the liquid crystal display, and also used as a substrate in an organic light emitting device. Therefore, an electrode and organic semiconductor layer are formed thereon to produce a device.

Further, the present invention provides a display comprising the optical film of the present invention as a retardation film. Specifically, in the liquid crystal display provided with liquid crystal cells and a polarizing plate on both sides of the liquid crystal cells, a liquid crystal display comprising the optical film of the present invention between the liquid crystal cells and the polarizing plate can be produced.

Hereinafter, the present invention will be described in detail with reference to Examples. However, Examples of the present invention may be modified in many different forms and should not be construed as being limited to Examples set forth herein. Rather, Examples of the present invention are provided so that this disclosure will be thorough and complete and will fully convey the concept of the present invention to those skilled in the art.

PREPARATION EXAMPLE

Synthesis of Polyarylate 600 g of distilled water, 20.6 g of NaOH, 47.6 g of 2,2-bis(4-hydroxyphenyl)propane, 9.2 g of bis(4-hydroxyphenyl)sulfone, and 2.5 g of benzyltriethylammonium chloride were added to a reactor that is provided with a stirrer, and the temperature of the reactor was maintained at 25° C. Separately, 49.8 g of aromatic dicarboxylic acid chloride mixture, in which the same amounts of isophthalic acid chloride and terephthalic acid chloride were mixed with each other, was dissolved in 600 g of methylene chloride. The mixture solution was added to the reactor containing the alkali aqueous solution under stirring. After the stirring was performed for 1 hour, a hydrochloric acid was added and the washing was performed with distilled water. The washing was repeated until the conductivity of the water layer was 20 μs/cm or less, the resulting solution was poured onto methanol to perform phase separation of polymers, the polymers were filtered, and the drying was performed in a vacuum oven at 120° C. for 12 hours. The weight average molecular weight and the glass transition temperature of the prepared polymer were evaluated using the following method.

(1) After the polymerization was finished, the polymerization solution was diluted with tetrahydrofuran for chromatography to have the content of 0.1 wt %, the measurement was performed by means of gel permeation chromatography using tetrahydrofuran for chromatography as an eluant, and the weight average molecular weight was measured using a standard polystyrene calibration curve.

(2) The glass transition temperature (Tg) was measured using DSC (differential scanning calorimeter). The thermal record of the sample was removed by increasing the temperature up to 300° C. at a rate of 10° C./min under a nitrogen atmosphere. Then, the temperature was reduced to room temperature and then increased to 300° C. at a rate of 10° C./min in order to measure the glass transition temperature Tg.

The weight average molecular weight of polyarylate was 69,000 and the glass transition temperature of polyarylate was 215° C. as the result of the above-mentioned analysis.

EXAMPLE 1

0.05 g of amino resin (MELCROSS™85 resin, P&ID) was added to 9.00 g of methylene chloride to prepare a homogenous solution. Then, 1.00 g of the polyarylate resin prepared in Preparation Example was added thereto, and stirred at 30° C. for 24 hours to prepare a homogenous solution. Precipitates and dust were removed using a 0.45 μm filter to prepare a polyarylate solution containing the amino resin. The dope was cast on a glass plate using a doctor blade at a speed of 0.6 m/min, and dried at room temperature for 60 minutes, at 100° C. for 60 minutes, at 150° C. for 60 minutes, and at 190° C. for 30 minutes to remove the solvent. Then, stripping was performed. The film had a thickness of 51 μm, a glass transition temperature (Tg) of 211° C., a total light transmittance of 91.8%, and a haze value of 0.6%. The total light transmittance and haze value were measured using HR-100 (MURAKAMI COLOR RESEARCH LABORATORY Co.) three times, and the mean value was used.

In this connection, the in-plane retardation and thickness direction retardation of the film were measured as follows. The thickness direction retardation was measured using Kobra21-ADH (commercial name) that is manufactured by Oji Scientific Instrument Co. Refractive indexes $n_x$, $n_y$, and $n_z$ were measured in respect to axes at 590 nm while the axis having the highest refractive index in the surface direction was set to an x-axis at 590 nm, the axis which was perpendicular to the x-axis in the surface direction was set to an y-axis, and the axis which was perpendicular to the x-y plane was set to a z-axis. The thickness of the film layer was measured to obtain the refractive indexes $n_x$, $n_y$, and $n_z$ in respect to the axes. The thickness direction retardation and the in-plane retardation of the film were calculated using Equations 1 and 2. The results are shown in Table 1.

EXAMPLE 2

A film was prepared in the same manners as in Example 1, except using 0.1 g of MELCROSS™85 resin (P&ID). The film had a thickness of 51 μm, a glass transition temperature (Tg) of 205° C., a total light transmittance of 92.0%, and a haze value of 0.5%. The results of the in-plane retardation and thickness direction retardation of the film are shown in Table 1.

EXAMPLE 3

A film was prepared in the same manners as in Example 1, except using 0.25 g of MELCROSS™85 resin (P&ID). The film had a thickness of 50 μm, a glass transition temperature (Tg) of 199° C., a total light transmittance of 91.9%, and a haze value of 0.6%. The results of the in-plane retardation and thickness direction retardation of the film are shown in Table 1.

EXAMPLE 4

A film was prepared in the same manners as in Example 1, except using 0.5 g of MELCROSS™85 resin (P&ID). The film had a thickness of 53 μm, a glass transition temperature (Tg) of 192° C., a total light transmittance of 91.8%, and a haze value of 0.7%. The results of the in-plane retardation and thickness direction retardation of the film are shown in Table 1.

COMPARATIVE EXAMPLE 1

A film was prepared in the same manners as in Example 1, except using no MELCROSS™85 resin (P&ID). The film had a thickness of 50 μm, a glass transition temperature (Tg) of 215° C., a total light transmittance of 92.1%, and a haze value of 0.6%. The results of the in-plane retardation and thickness direction retardation of the film are shown in Table 1.

TABLE 1

| | In-plane retardation (nm) | Thickness direction retardation (nm) | Thickness (μm) | Retardation to thickness (nm/μm) |
|---|---|---|---|---|
| Example 1 | 0 | −770 | 51 | −15.1 |
| Example 2 | 0 | −530 | 51 | −10.4 |
| Example 3 | 0 | −155 | 50 | −3.2 |
| Example 4 | 0 | −9 | 53 | −0.2 |
| Comparative Example 1 | 0 | −860 | 50 | −17.2 |

The invention claimed is:

1. A resin composition for an optical film, comprising:
an amino resin having a triazine structure, and
a polyarylate resin.

2. The resin composition for an optical film according to claim 1, further comprising a curing catalyst for the amino resin.

3. The resin composition for an optical film according to claim 2, wherein the catalyst comprises at least one selected from the group consisting of $C_1$ to $C_{10}$ organic acids, inorganic acids and tin compounds.

4. The resin composition for an optical film according to claim 1, wherein a thickness direction retardation, of said optical film, defined as the following Equation 1 is controlled by the content of the amino resin having a triazine structure, and an in-plane retardation, of said optical film, defined as the following Equation 2 is controlled by stretching:

$$R_{th} = \left(n_z - \frac{n_x + n_y}{2}\right) \times d \quad \text{<Equation 1>}$$

wherein $n_x$ is a refractive index of the direction having the highest refractive index in a film surface, $n_y$ is the refractive index of the direction perpendicular to the direction of $n_x$ in the film surface, $n_z$ is the refractive index of the direction perpendicular to a plane of the film, d is a thickness of the film, and $R_{th}$ is a thickness direction retardation, and $$R_{in} = (n_x - n_y) \times d \quad \text{<Equation 2>}$$

wherein $n_x$ is a refractive index of the direction having the highest refractive index in a film surface, $n_y$ is the refractive index of the direction perpendicular to the direction of $n_x$ in the film surface, d is a thickness of the film, and $R_{in}$ is an in-plane retardation.

5. The resin composition for an optical film according to claim 1, wherein the amino resin having a triazine structure consists of a monomer represented by the following Formula 1, or an oligomer thereof:

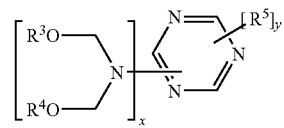

<Formula 1> wherein x and y are an integer, satisfying the following conditions: x+y=3, 1≦x≦3, and 0≦y≦2, and
$R^3$, $R^4$ and $R^5$ are each independently selected from the group consisting of hydrogen, halogen, alkyl having $C_1$-$C_{10}$ carbon atoms, arylalkyl having $C_7$-$C_{12}$ carbon atoms, aryl having $C_6$-$C_{12}$ carbon atoms, and acyl having $C_1$-$C_{12}$ carbon atoms.

6. The resin composition for an optical film according to claim 1, wherein the amino resin having a triazine structure is contained in an amount of 0.1 to 100 parts by weight, based on 100 parts by weight of the polyarylate.

7. The resin composition for an optical film according to claim 5, wherein the amino resin having a triazine structure comprises at least one kind selected from the group consisting of hexamethoxymethylenemelamine, hexaethoxymethylenemelamine, hexahydroxymethylenemelamine, hexabutoxymethylenemelamine, tetrahydroxymethylenebenzoguanamine, tetramethoxymethylenebenzoguanamine, tetraethoxybenzoguanamine and tetrabutoxymethylenebenzoguanamine.

8. The resin composition for an optical film according to claim 1, wherein the polyarylate resin is an aromatic polyester resin comprising a repeating unit represented by the following Formula 2, prepared by condensation of aromatic dicarboxylic acid and aromatic diol:

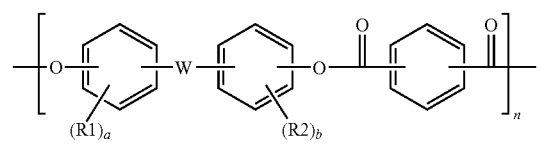

<Formula 2> wherein a and b are each independently an integer of 0 to 4,
R1 and R2 are each independently selected from halogen, alkyl, alkenyl, or alkynyl having $C_1$-$C_{12}$ carbon atoms, arylalkyl having $C_7$-$C_{12}$ carbon atoms, aryl having $C_6$-$C_{12}$ carbon atoms, nitrile having $C_1$-$C_{12}$ carbon atoms, alkoxy having $C_1$-$C_{12}$ carbon atoms, and acyl having $C_1$-$C_{12}$ carbon atoms, with the proviso that a is 2 or more, two or more of R1 is the same or different from each other, with the proviso that b is 2 or more, two or more of R2 is the same or different from each other, and
W is one selected from alkylidene having $C_1$-$C_{30}$ carbon atoms, alkylene having $C_2$-$C_{30}$ carbon atoms, cycloalkylidene having $C_3$-$C_{30}$ carbon atoms, cycloalkylene having $C_3$-$C_{30}$ carbon atoms, phenyl-substituted alkylene having $C_2$-$C_{30}$ carbon atoms, nitrogen derivatives such as NH or NR (wherein, R is defined as in R1 and R2), phosphorus derivatives, phosphorus oxide, oxygen, sulfure, sulfoxide and sulfone.

9. The resin composition for an optical film according to claim 8, wherein the aromatic dicarboxylic acid comprises at least one kind selected from the group consisting of terephthalic acid, isophthalic acid, dibenzoic acid, naphthalene dicarboxylic acid, 4,4'-methylene-bis(benzoic acid), 1,2-bis (4-hydroxycarbonylphenyl)ethane, 2,2-bis(4-hydroxycarbonylphenyl)propane, 4,4'-oxo-bis(benzoic acid), bis(4-hydroxycarbonylphenyl)sulfide, bis(4-hydroxycarbonylphenyl)sulfone, and aromatic dicarboxylic acid in which aromatic groups thereof are substituted with a $C_1$ to $C_2$ alkyl group or a halogen group.

10. The resin composition for an optical film according to claim 8, wherein the aromatic diol comprises at least one kind selected from the group consisting of bis(4-hydroxyaryl)alkane, bis(hydroxyaryl)cycloalkane, dihydroxy diarylether, dihydroxy diarylsulfide, dihydroxy diarylsulfoxide and dihydroxy diarylsulfone.

11. The resin composition for an optical film according to claim 1, wherein the polyarylate resin has a weight average molecular weight of 10,000 to 500,000.

12. An optical film comprising the resin composition of claim 1.

13. The optical film according to claim 12, wherein a thickness direction retardation defined as the following Equation 1 is controlled according to the content of the amino resin having a triazine structure, and an in-plane retardation defined as the following Equation 2 is controlled by stretching:

$$R_{th} = \left(n_z - \frac{n_x + n_y}{2}\right) \times d \qquad \text{<Equation 1>}$$

wherein $n_x$ is a refractive index of the direction having the highest refractive index in a film surface, $n_y$ is the refractive index of the direction perpendicular to the direction of $n_x$ in the film surface, $n_z$ is the refractive index of the direction perpendicular to a plane of the film, d is a thickness of the film, and $R_{th}$ is a thickness direction retardation, and $$R_{in} = (n_x - n_y) \times d \qquad \text{<Equation 2>}$$

wherein $n_x$ is a refractive index of the direction having the highest refractive index in a film surface, $n_y$ is the refractive index of the direction perpendicular to the direction of $n_x$ in the film surface, d is a thickness of the film, and $R_{in}$ is an in-plane retardation.

14. The optical film according to claim 12, wherein the optical film has a thickness direction retardation of a negative value, having an absolute value in the range of 0 to 1000 nm, and an in-plane retardation in the range of 0 to 1000 nm.

15. The optical film according to claim 12, wherein the optical film comprises at least one selected from the group consisting of a gas barrier layer, a moisture barrier layer, an oxygen barrier layer and a transparent conductive layer on at least one side of the film.

16. The optical film according to claim 12, wherein the optical film is treated by at least one selected from the group consisting of hard coating treatment, anti-reflection treatment, anti-sticking treatment, diffusion treatment, and anti-glare treatment.

17. The optical film according to claim 12, wherein the optical film is stretched in a ratio of 1%-500% in in-plane direction.

18. The optical film according to claim 12, wherein the optical film is single layered structure or laminated structure with two or more layers.

19. A display comprising the optical film of claim 12 as a substrate.

20. A display comprising the optical film of claim 12 as a retardation film.

\* \* \* \* \*